(12) United States Patent
Hundt et al.

(10) Patent No.: US 6,851,110 B2
(45) Date of Patent: Feb. 1, 2005

(54) OPTIMIZING AN EXECUTABLE COMPUTER PROGRAM HAVING ADDRESS-BRIDGING CODE SEGMENTS

(75) Inventors: Robert Hundt, Sunnyvale, CA (US); Vinodha Ramasamy, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 09/876,655

(22) Filed: Jun. 7, 2001

(65) Prior Publication Data

US 2002/0188932 A1 Dec. 12, 2002

(51) Int. Cl.[7] .............................................. G06F 9/45
(52) U.S. Cl. ...................... 717/159; 717/151; 717/153; 717/157; 717/158
(58) Field of Search ................................ 717/151, 153, 717/162, 158, 159, 157

(56) References Cited

U.S. PATENT DOCUMENTS

| | | | | |
|---|---|---|---|---|
| 5,469,572 A | * | 11/1995 | Taylor | 717/152 |
| 5,740,447 A | * | 4/1998 | Kurahashi | 717/159 |
| 5,857,105 A | * | 1/1999 | Ayers et al. | 717/159 |
| 5,940,622 A | * | 8/1999 | Patel | 717/159 |
| 6,064,818 A | * | 5/2000 | Brown et al. | 717/159 |
| 6,292,940 B1 | * | 9/2001 | Sato | 717/157 |
| 6,295,644 B1 | * | 9/2001 | Hsu et al. | 717/159 |
| 6,327,704 B1 | * | 12/2001 | Mattson et al. | 717/153 |
| 6,463,582 B1 | * | 10/2002 | Lethin et al. | 717/158 |
| 6,578,194 B1 | * | 6/2003 | Baumgart et al. | 717/153 |
| 6,721,876 B1 | * | 4/2004 | Chen et al. | 712/239 |

* cited by examiner

*Primary Examiner*—Todd Ingberg
*Assistant Examiner*—Qamrun Nahar

(57) ABSTRACT

Method and apparatus for optimizing an executable computer program having address-bridging code segments. Various embodiments are described for optimizing an executable computer program that occupies a first address space and has address-bridging code segments. Address-bridging code segments, target code segments referenced by the address-bridging segments, and calling code segments that reference the address-bridging segments are identified during execution of the program. A second address space is allocated for storage of relocated functions. The calling code segments and the target code segments are relocated to the second address space, and references to the address-bridging code segments are replaced with references to the target code segments in the second address space. For references to the calling code segments in the first address space, control is directed to the calling code segments in the second address space.

14 Claims, 3 Drawing Sheets

OPTIMIZING AN EXECUTABLE COMPUTER PROGRAM HAVING ADDRESS-BRIDGING CODE SEGMENTS

FIELD OF THE INVENTION

The present invention generally relates to optimizing executable computer program code, and more particularly to the optimization of a program having address-bridging code segments.

BACKGROUND

Executable computer programs include branch instructions that when executed direct program control to target addresses in the program. In some cases, branch instructions are used to transfer control to a code segment that implements a source-code defined function. For example, if the source code sets forth a "function" that averages an input list of values, the function may be invoked by name as needed in the source code. The executable code includes a target code segment that implements the function and branch instructions having target addresses that reference the target code segment. It will be appreciated that different languages have different names for functions such as procedure, routine, or method.

Advances in memory addressing by processors have accompanied the advances in processor speed. A recent milestone is the introduction of the 64-bit processor, which allows computer programs to address 64 bits of address space. However, in some architectures a direct branch instruction has an effective target address range that is less than the total address supported address space. For example, the limit of an instruction pointer relative branch target address is 25 bits in Hewlett Packard Company's 64-bit machines. However, an executable program may occupy an address space that is greater than is addressable with 25 bits. Thus, the address of a branch instruction and the target of the branch instruction may be further apart than is addressable with 25 bits.

Instruction pointer relative branch instructions are referred to herein as "direct branch instructions" or "direct branches." Direct branches are typically the fastest branch instructions on microprocessors since paths can be predicted well in advance by the hardware, resulting in fast execution times.

An address-bridging code segment is used to bridge the addressing distance between a direct branch and the target code segment if the target code segment is beyond the addressing limit of a direct branch instruction. The way the address-bridging technique works is as follows. When a linker detects that the target code segment of a direct branch instruction is beyond the addressing limit, the target address of the direct branch instruction is modified to reference an address-bridging code segment. The address-bridging code segment is within the direct branch addressing limit and uses an indirect branch to transfer control to the target code segment. An indirect branch instruction allows transfer of control within the full 64-bit address space. On Hewlett Packard's 64-bit machines, "long branch" instructions can be used for the same purpose.

Address-bridging code segments may hinder performance for some applications or libraries. Since the address-bridging code is, from a logic standpoint, unnecessary to provide the functionality of the application, execution of the address-bridging code wastes processor time.

A method and apparatus that address the aforementioned problems, as well as other related problems, are therefore desirable.

SUMMARY OF THE INVENTION

The invention optimizes an executable computer program that occupies a first address space and has address-bridging code segments. The address-bridging code segments, target code segments referenced by the address-bridging segments, and calling code segments that reference the address-bridging segments are identified during execution of the program. A second address space is allocated for storage of relocated functions. The calling code segments and the target code segments are relocated to the second address space, and references to the address-bridging code segments are replaced with references to the target code segments in the second address space. For references to the calling code segments in the first address space, control is directed to the calling code segments in the second address space.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is described in terms of direct branch instructions. The instruction pointer relative branch instruction on Hewlett Packard machines is an example direct branch instruction. Those skilled in the art will appreciate, however, that the invention is applicable to other architectures in which address-bridging code segments are employed to overcome the addressing limits of certain branching instructions. Thus, the invention is not intended to be limited to any particular machine architecture or instruction set architecture. Furthermore, the invention is applicable to most branches involving an address-bridging code segment and is not limited to branches to functions, even though the example embodiments are described in terms of "functions".

Figure 1:
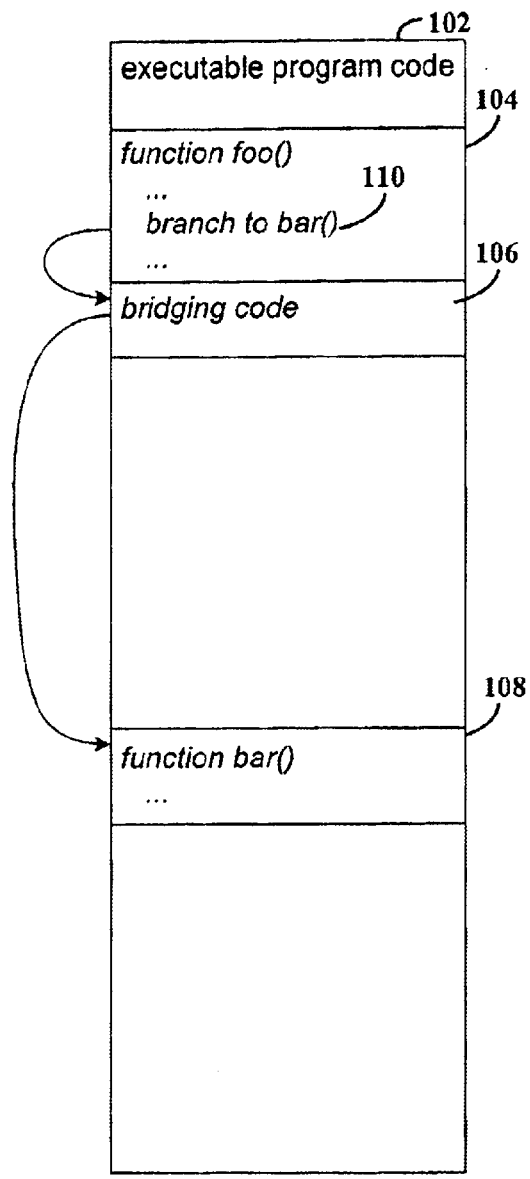
FIG. 1 is a block diagram of executable program code that includes address-bridging code.

FIG. 1 is a block diagram of executable program code that includes address-bridging code to bridge a call from a first function to a second function. Executable program 102 includes function foo( ), shown as block 104, address-bridging code at reference 106, and function bar( ), shown as block 108.

Function foo( ) includes an instruction 110 that branches to the address-bridging code 106. In the original source code, the function foo( ) calls the function bar( ). The example assumes that the executable code for the function bar( ) is located beyond the address range of a direct branch instruction. In generating the executable code, the linker inserts address-bridging code 106 that uses an indirect branch to target the function bar( ) and generates a direct branch instruction in the function foo( ) to reference the address bridging code. "Indirect" branch instructions in Hewlett Packard's 64-bit machines include branch instructions known as "long" branches. To accomplish the source code specified branch to bar( ), when the function foo( ) is executed the function foo( ) first branches to the bridging code with a direct branch, and the bridging code branches to the function bar( ) with an indirect branch.

Figure 2:
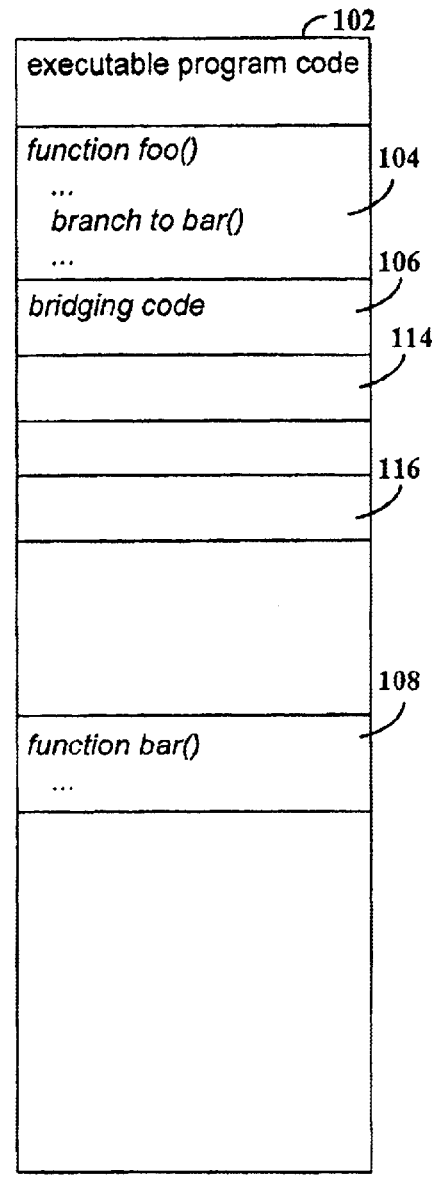
FIG. 2 is a block diagram of executable program code in which address-bridging code has been eliminated and reached code has been relocated.
Figure 2:
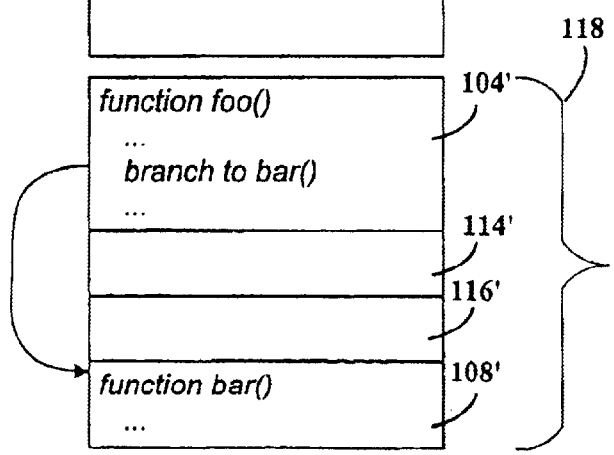

FIG. 2 is a block diagram of example executable program code in which executed functions have been relocated to a separate address space and selected address-bridging code has been eliminated. Since for most some applications only a small portion of code is actually reached during program execution, the reached code can be consolidated into an address space that does not require address-bridging stubs to reference code in the consolidated address space from code in the consolidated address space. Program performance is improved by eliminating the address-bridging code since the address-bridging code is overhead.

The example assumes that function foo( ) 104 and function bar( ) 108, which is called by foo( ), are reached during program execution. The function bar( ) is beyond the addressing limit of a direct branch from foo( ), and the bridging code 106 is used to reach bar( ) from foo( ). Blocks 114 and 116 illustrate additional functions that are reached during program execution.

In the example embodiment, code segments at the function level are selectively relocated. However, those skilled in the art will appreciate that other units of code segments could be selected for relocation. For example, at a finer level of granularity parts of functions can be relocated. The parts of functions include extended basic blocks and basic blocks. A basic block is a sequence of instructions with a single entry point and a single exit point. An extended basic block is a sequence of instructions with multiple entry points and a single exit point. In another embodiment, profile based optimization places "cold" parts of a function far away from "hot" parts of the function. "Cold" refers to code segments within a function that are not reached very often. Relocating the hot parts of a function provides better run-time behavior due to fewer cache misses and TLB misses, for example.

In one embodiment, a code segment is relocated by creating a copy in another address space and replacing the first instruction of the old function with a long branch to the copy in the new address space.

When function foo( ) 104 is reached during execution of program 102, the executable code for foo( ) is relocated to address space 118, as shown by block 104'. The address-bridging code segments, for example bridging code 106, that are referenced by foo( ) are then identified for subsequent consideration for removal. Since foo( ) 104 was relocated, the direct branch to the bridging code 106 must be replaced with an indirect branch in foo( ) 104' to reference the bridging code. In order to ensure that other calls to foo( ) execute the relocated foo( ) 104', the first instruction of foo( ) 104 is replaced with a long branch to foo( ) 104'. Assuming that foo( ) is the first function reached and relocated, the program counter is restored to execute foo( ) 104'.

As execution of function foo( ) 104' continues, the indirect branch to bridging code 106 leads to the function bar( ) 108. When bar( ) 108 is reached, the function is relocated to address space 118, as shown by block 108'. The address-bridging code segments that are referenced by bar( ) 108 are identified and recorded (none are shown in this example).

Once bar( ) 108 is relocated as bar( ) 108', the indirect branch in foo( ) 104' to bridging code 106 is replaced with a direct branch to bar( ) 108'. In subsequent iterations in which foo( ) 104' is executed, foo( ) invokes bar( ) 108' with a direct branch, thereby eliminating execution of address-bridging code 106. Execution of the program continues and other functions, for example, functions 114 and 116, are relocated as functions 114' and 116'.

In another embodiment, branches in foo( ) 104 that are identified to target address-bridging stubs are patched with a break in foo( ) 104'. When a break is reached during execution of foo( ) 104', the target of the address-bridging code, bar( ) 108 is relocated, and the branch in foo( ) 104' is changed to a direct branch to 108'. This embodiment saves the step of first inserting a long branch in foo( ) 104' to bridging code 106 and then later changing the long branch to a direct branch to bar( ) 108'.

Figure 3:
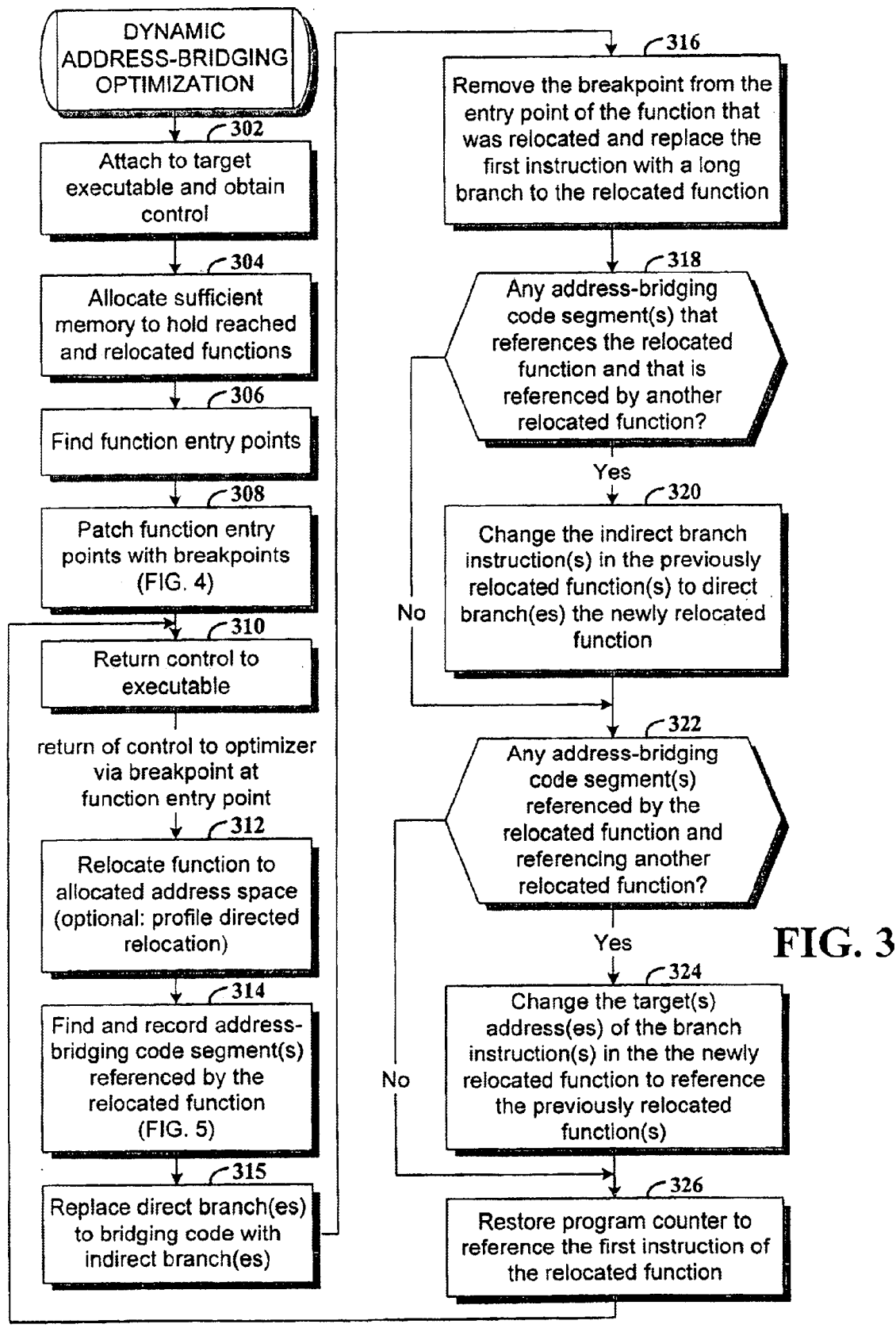
FIG. 3 is a flowchart of a process for optimizing address-bridging code in accordance with one embodiment of the invention.

FIG. 3 is a flowchart of a process for optimizing address-bridging code in accordance with one embodiment of the invention. The process generally entails relocating functions that are reached during execution of a program. The functions are relocated to an address space in which the functions located therein can reference one another with a direct branch instead of with address-bridging code segments. Thus, the overhead associated with address-bridging code segments is eliminated.

At step 302, an optimizer process attaches to a target executable application and obtains control. Those skilled in the art will appreciate that this step is accomplished using known, conventional techniques. For example, in one embodiment the optimizer process is part of an instrumentation tool. At step 304, the process allocates and address space in memory for storage of relocated functions.

At step 306, entry points of the functions in the executable application are located. In various embodiments, the present invention uses compiler-generated checkpoints to identify function entry points and endpoints in executable program code. The function entry points and end-points are then used to support analysis of the executable program code. Compiler-generated checkpointing is described in the patent/application entitled, "COMPILER-BASED CHECK-POINTING FOR SUPPORT OF ERROR RECOVERY", by Thompson et al., filed on Oct. 31, 2000, and having U.S. patent application Ser. No. 09/702,590, the contents of which are incorporated herein by reference.

Figure 4:
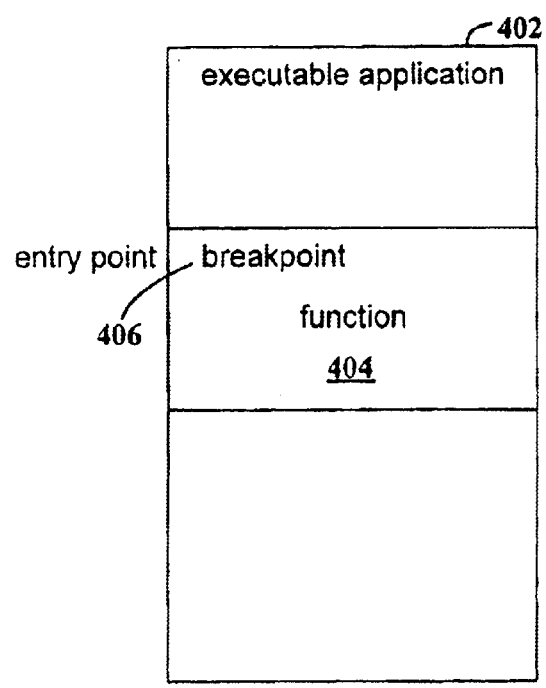
FIG. 4 is a block diagram that illustrates the functional layout of memory used by an executable application during the relocation process.

Each of the function entry points is patched with a breakpoint at step 308. The instructions at the function entry points are saved in a table so that they can be restored at the appropriate time. FIG. 4 is a block diagram that illustrates the functional layout of memory used by an executable application during the relocation process. As shown and described in the process of FIG. 3, the entry points of the functions in the executable application 402 are patched with breakpoints. For example, the entry point of function 404 is patched with breakpoint 406. When the breakpoint is encountered in executing the application 402, a function 404 is relocated (FIG. 3, step 312).

Returning now to FIG. 3, at step 310, control is returned to the executable program. When a breakpoint is encountered at a function entry point in the executable program, control is returned to the optimizer process. At step 312, the optimizer relocates the function to the allocated address space (step 304) and replaces the breakpoint at the entry point with the original instruction. In another embodiment, relocation of functions is profile directed. That is, execution information gathered by an instrumentation tool, or similar tool, is used in deciding whether a function should be relocated. For example, for functions that are seldom called, relocation may not be worth the cost since the runtime overhead associated with the address-bridging stub is minimal. In one embodiment, the instrumentation information used in deciding whether to relocate the functions is static, and in another embodiment, the instrumentation information is dynamic. In the static embodiment, an execution profile that is generated in one run of the program is used in a second run to select the functions to relocate. In the dynamic embodiment, the optimizer process is part of the instrumentation tool, and the instrumentation information gathered during execution is used to select the functions to relocate. If functions that were frequently executed early on become infrequently executed, the optimizer selects for relocation other recently executed functions to replace the now infrequently executed functions.

At step 314, the address-bridging code segments that are referenced by the relocated function are identified and the addresses are associated with the relocated function. The addresses are used later when other functions are relocated. At step 315, the direct branches to the address-bridging code segments referenced in the relocated function are replaced with indirect branches. This allows the relocated function can still reach other non-relocated functions when execution resumes. Alternatively, the branches to the bridging code are replaced with breakpoints, as described above.

At step 316, the breakpoint that was placed at the first instruction of the function that was relocated is replaced with an indirect branch to the function as relocated in the relocation address space. For example, the breakpoint at the entry point of foo( ) 104 is replaced with an indirect branch to foo( ) 104'. Subsequent calls to foo( ) 104 from non-relocated functions in the executable 102 are thereby directed to foo( ) 104'.

Decision step 318 tests whether any address-bridging segments referenced by previously relocated functions reference the newly relocated function. This information is that which was stored at step 314. If there are previously relocated functions that reference the newly relocated function, the process is directed to step 320. At step 320, the indirect branch instruction(s) in the previously relocated function(s) that references the address-bridging segment is changed to a direct branch to the newly relocated function. The process continues at decision step 322.

Decision step 322 tests whether the newly relocated function references an address-bridging segment(s) that branches to a previously relocated function. If so, the process is directed to step 324 to change the target addresses of the direct branch instructions (which reference the address-bridging code) to an address(es) that references the previously relocated function(s). This direct branch is only possible if the range between the two functions is "small" enough. For example, a direct branch is possible if the range is addressable with 25 bits on Hewlett Packard's 64-bit machines. At step 326, the program counter is restored to reference the first instruction of the newly relocated function, for example, the first instruction of the function foo( ) 104'. The process then continues at step 310 where control is returned to the executable.

Figure 5:
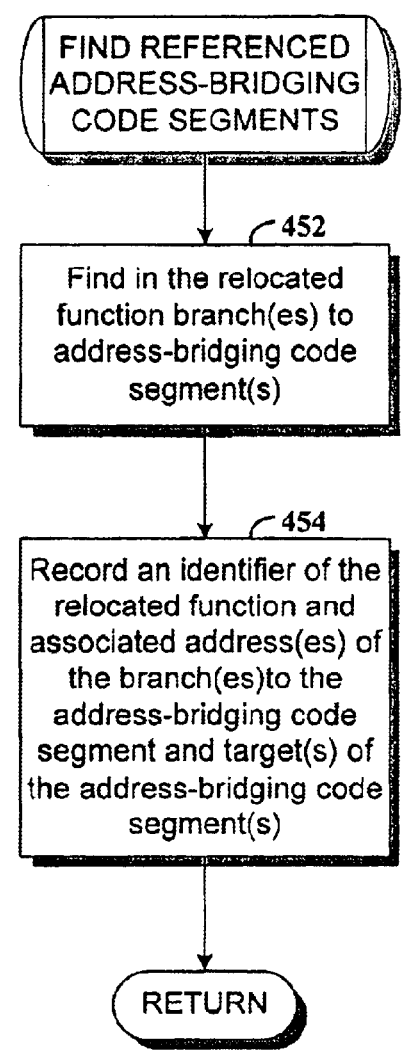
FIG. 5 is a flowchart of an example process for finding address-bridging code segments that are referenced in a relocated function.

FIG. 5 is a flowchart of an example process for finding address-bridging code segments that are referenced in a relocated function. At step 452, the branch instructions in the function are identified, and the code segments at the target addresses of the branch instructions are analyzed. Since address-bridging code is inserted by a linker, the same layout and instructions are used in each address-bridging code segment. In one embodiment, the instructions and sequence in the target code segment are matched against a known pattern. In another embodiment, auxiliary information is obtained from the linker, for example text, symbols, or annotations that are stored in the executable file. The auxiliary information identifies the locations of the address-bridging code segments.

At step 454 the address(es) of the branch(es) in the relocated function (as identified in step 452) is stored in association with an identifier of the relocated function. This information is used later when another function ("later function") is relocated, and the later function is invoked by the relocated function via a branch to an address-bridging code segment.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for optimizing an executable computer program that occupies a first address space and having address-bridging code segments, comprising:

identifying address-bridging code segments, target code segments referenced by the address-bridging segments, and calling code segments that reference the address-bridging segments during execution of the program;

allocating a second address space;

relocating the calling code segments and the target code segments to the second address space;

replacing references to the address-bridging code segments with references to the target code segments in the second address space; and for references to the calling code segments in the first address space, directing control to the calling code segments in the second address space.

2. The method of claim 1, further comprising:

identifying target code segments that are reached during execution; and relocating only code segments that are reached during execution.

3. The method of claim 2, wherein each of the calling code segments in the first address space includes a branch instruction having a target address that references an address-bridging code segment and further comprising replacing target addresses of the branch instructions in the relocated calling code segments with addresses that reference the relocated target code segments.

4. The method of claim 3, wherein the first address space has a size that is greater than a range reachable by direct branch instructions, and the second address space has a size that is within the range of direct branch instructions.

5. The method of claim 1, wherein each of the calling code segments in the first address space includes a branch instruction having a target address that references an address-bridging code segment and further comprising replacing target addresses of the branch instructions in the relocated calling code segments with addresses that reference the relocated target code segments.

6. The method of claim 1, wherein the first address space has a size that is greater than a range reachable by direct branch instructions, and the second address space has a size that is within the range of direct branch instructions.

7. An apparatus for optimizing an executable computer program that occupies a first address space and having address-bridging code segments, comprising:

means for identifying address-bridging code segments, target code segments referenced by the address-bridging segments, and calling code segments that reference the address-bridging segments during execution of the program;

means for allocating a second address space;

means for relocating the calling code segments and the target code segments to the second address space;

means for replacing references to the address-bridging code segments with references to the target code segments in the second address space; and means, for references to the calling code segments in the first address space, for directing control to the calling code segments in the second address space.

8. A computer-implemented method for optimizing an executable computer program that occupies a first address space and having address-bridging code segments, comprising:

replacing function entry points in the executable program with breakpoints; allocating a second address space;

executing the program;

for each executed function, relocating the executed function to the second address space and restoring the function entry point of the relocated function;

for each first relocated function that references a second relocated function via a branch instruction to an address-bridging code segment, changing the branch instruction to directly reference the second relocated function; and for each relocated function, replacing the function entry point in the first address space with a branch instruction that references the relocated function.

9. The method of claim 8, further comprising relocating only functions that are reached during execution.

10. The method of claim 9, further comprising:

for each branch instruction in a relocated function that targets an address-bridging code segment, replacing the branch instruction with a breakpoint;

upon reaching a breakpoint in a relocated function, relocating a function referenced by the address-bridging segment to the second address space and replacing the breakpoint with a branch instruction targeting the function referenced by the address-bridging code segment.

11. The method of claim 10, further comprising:

for each branch instruction in a relocated function that targets an address-bridging code segment, recording an address of the branch instruction in association with a target of the address-bridging code segment; and if a newly relocated function is referenced by a recorded target of an address-bridging code segment, then changing the branch instruction at the address associated with the recorded target to target the newly relocated function.

12. The method of claim 8, further comprising:

for each branch instructions in a relocated function that targets an address-bridging code segment, replacing the branch instruction with a breakpoint;

upon reaching a breakpoint in a relocated function, relocating a function referenced by the address-bridging segment to the second address space and replacing the breakpoint with a branch instruction targeting the function referenced by the address-bridging code segment.

13. The method of claim 8, further comprising:

for each branch instruction in a relocated function that targets an address-bridging code segment, recording an address of the branch instruction in association with a target of the address-bridging code segment; and if a newly relocated function is referenced by a recorded target of an address-bridging code segment, then changing the branch instruction at the address associated with the recorded target to target the newly relocated function.

14. An apparatus for optimizing an executable computer program that occupies a first address space and having address-bridging code segments, comprising:

means for replacing function entry points in the executable program with breakpoints;

means for allocating a second address space;

means for executing the program;

means, for each executed function, for relocating the executed function to the second address space and restoring the function entry point of the relocated function;

means, for each first relocated function that references a second relocated function via a branch instruction to an address-bridging code segment, for changing the branch instruction to directly reference the second relocated function; and means, for each relocated function, for replacing the function entry point in the first address space with a branch instruction that references the relocated function.

* * * * *